United States Patent [19]

Zettl

[11] Patent Number: 5,158,407

[45] Date of Patent: Oct. 27, 1992

[54] DEVICE FOR THE CONNECTION OF TWO TOOL PORTIONS OF MACHINE TOOLS

[76] Inventor: Otto Zettl, Schwedenstr. 32, D-8969 Reicholzried, Fed. Rep. of Germany

[21] Appl. No.: 577,463

[22] Filed: Sep. 4, 1990

[30] Foreign Application Priority Data

Sep. 11, 1989 [DE] Fed. Rep. of Germany ....... 3930245

[51] Int. Cl.⁵ .................... B23C 5/26; B23Q 3/12
[52] U.S. Cl. .................... 409/234; 279/43.5; 279/89; 285/321; 403/373
[58] Field of Search ............ 279/1 TE, 46 R, 89, 279/33, 34, 66–68, 43.1–43.5, 44, 46.2, 46.5; 409/234, 232; 403/344, 373; 82/160; 285/321

[56] References Cited

U.S. PATENT DOCUMENTS

| 2,877,732 | 3/1959 | Eaton | 285/321 X |
| 2,901,269 | 8/1959 | Rickard | 285/321 X |
| 3,381,983 | 5/1968 | Hanes | 285/321 |
| 4,215,961 | 8/1980 | Babel | 403/373 X |
| 4,854,764 | 8/1989 | Faber et al. | 285/321 X |

FOREIGN PATENT DOCUMENTS

| 0310942 | 9/1988 | European Pat. Off. | |
| 1087269 | 4/1984 | U.S.S.R. | 409/232 |
| 1302037 | 4/1987 | U.S.S.R. | 403/373 |
| 512777 | 8/1937 | United Kingdom | 403/373 |
| 2212745 | 11/1988 | United Kingdom | |

Primary Examiner—Steven C. Bishop
Attorney, Agent, or Firm—Notaro & Michalos

[57] ABSTRACT

A tool head can be connected to a tool holder by an open-ended tension ring provided in a peripheral conical recess of the tool holder. The diameter of the tension ring can be reduced by an actuating device acting tangentially with respect to the tension ring. In a coupling position of both tool portions, the tension ring at one side is supported by a side surface of the recess and at the opposite side presses against an annular shoulder of a fitting pin of the tool head.

9 Claims, 2 Drawing Sheets

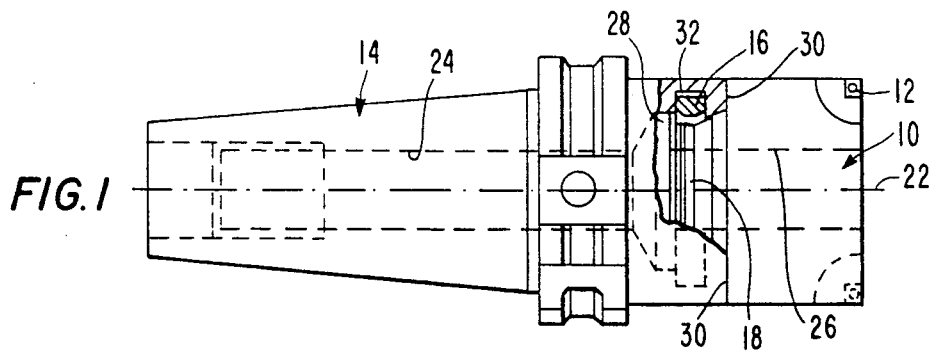
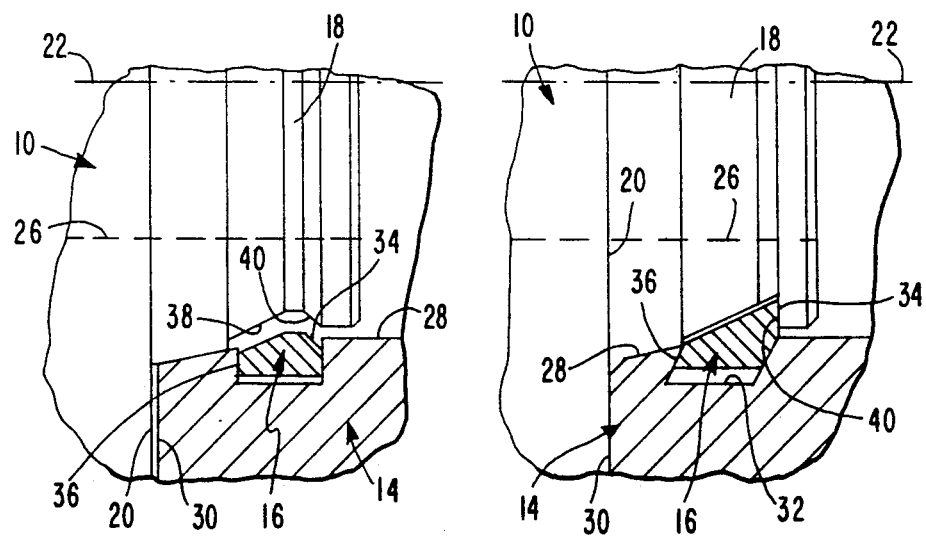
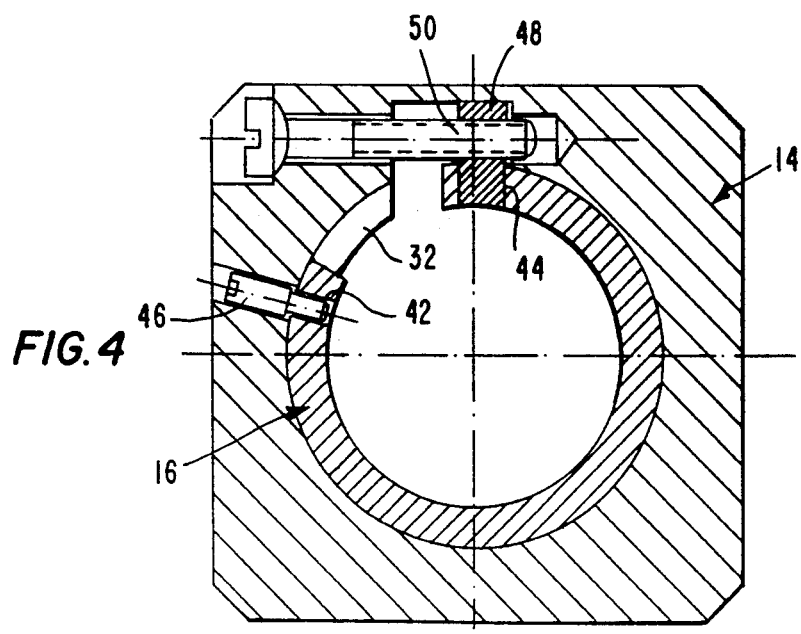

DEVICE FOR THE CONNECTION OF TWO TOOL PORTIONS OF MACHINE TOOLS

BACKGROUND OF THE INVENTION

The invention relates to a device for the connection of two tool portions, namely a tool head and a tool holder of machine tools, comprising a fitting pin provided on one tool portion and surrounded by an annular surface extending perpendicularly to the pin, a mating bore provided in the other tool portion for receiving the fitting pin and surrounded by an annular end face, a recess provided in the bore of the other tool portion, tension means arranged in the recess for a movement at least partly in radial direction, and abutment means provided at the pin cooperating with the tension means to convert a radial movement of the tension means into an axial movement of the pin to draw the annular surfaces of the tool portions tightly against each other upon operation of actuating means.

A device of this kind is known from UK-document 2 212 745. Two radially aligned internal threads are provided. Each one forms a recess. The tension means consist of screws threaded radially into the internal threads. The screws press radially against a radial bolt provided in a transverse bore of the pin. The ends of the bolt are wedge-shaped, to convert the radial movements of the screws into an axial displacement of the pin.

Another device for the connction of two tool portions as known from the EP 310 942 A1 uses an axial drawbar urging tension balls radially outwards into recesses of the tool holder to couple a tool head.

Both known devices have the same disadvantage that the tension arrangement requires space in the interior of the pin of the one tool portion, wherefore axial connections extending through the coupling device—for instance coolant and hydraulic conduits, electric current wiring and mechanical rods and lever systems—cannot be installed. A further disadvantage consists in that the means for the conversion of radial forces into an axial tension stroke comprise only few small dimensioned wedge surface areas, which are subjected to high stress and because of abrasion the coupling device has a limited working life.

SUMMARY OF THE INVENTION

Therefore, a main object of the invention is to provide a connection system for connecting two tool portions namely a tool head and a tool holder in a form-fit manner, without requiring space in the interior of the tool portions, so that both tool portions can be designed as hollow bodies.

One further object of the invention is to provide a novel tension means by which the pin of the one tool portion is positively coupled more uniformly and the stresses are distributed around the periphery thereof.

One further object of the invention is to provide a coupling system, which avoids any radial distortion of the tool portions upon operation of the actuating means.

Last but not least, it is an object of the invention to provide a connecting device having actuating means which require only small operating forces to achieve high axial clamping forces substantially uniformly distributed around the periphery of the tool portions.

Therefore, the invention is distinguished with respect to the known connecting device mentioned at the beginning in that the recess extends along the periphery of the bore, the tension means comprises open-ended steel ring means guided in the recess, the circumferential interspace between the ends therof engaged by abutments respectively, that the actuating means engages with at least one of said abutments to change said circumferential interspace thereof and simultaneously to reduce the diameter of the ring means and to at least partly displace the ring means inwardly to project radially into the bore and that the abutment means of the pin consists of an annular shoulder provided near the front end of the pin, and that the ring means comprises at least one annular clamping surface at the one side thereof cooperating with the annular shoulder of the pin and at least one annular supporting surface at the opposite side bearing against an annular side face of the recess, the ring means thereby forming an annularly extending form-fit coupling device between the two tool portions.

While it is known per se to use tension means in the form of a clamping ring, which can be tangentially actuated to achieve a radial clamping force for example to clamp a water hose on a fitting, the invention uses the ring means to positively connect two tool portions in axial direction in a form-fit manner, whereby the ring means at the same time positively engage with both tool portions, especially a tool holder and a tool head.

The ring means according to one embodiment of the invention comprises a one-piece open-ended spring steel ring member. According to another embodiment of the invention the ring means consist of two or more annularly extending portions fastened at adjacent ends respectively in order to simplify the assemby within the peripheral recess.

BRIEF DESCRIPTION OF THE DRAWINGS

FIG. 1 is a side view of the tool head connected to a tool holder by a peripherally tensioned connecting device;

FIG. 2 is a laterally reversed arrangement with respect to FIG. 1 in greater detail, and comprising a tension ring adapted to positively connect a lefthand tool head to the righthand tool holder;

FIG. 3 is a view similar to FIG. 2 but illustrating a second embodiment of a tension ring in coupling position;

FIG. 4 is a cross-section of the tool holder containing the tension ring;

DESCRIPTION OF THE PREFERRED EMBODIMENTS

Figure 5:
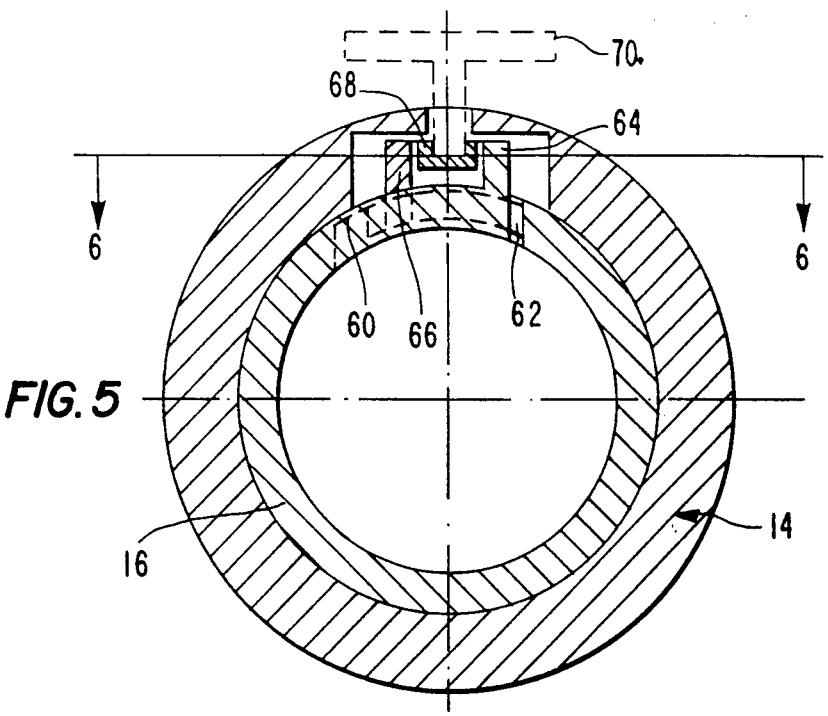
FIG. 5 is a cross-section of another embodiment of an actuating device to tension the tension ring.

According to FIG. 1 a tool head or first tool portion 10 carrying tools 12 at the front end thereof is connected to a tool holder or second tool portion 14 by means of an open ended tension ring 16, provided in a recess 32 of a bore of the tool holder. The tool head 10 comprises a central plug or fitting pin 18 surrounded by an annular surface 20 extending perpendicularly to an axis 22 of pin 18. An axial cylindrical channel 24 extends over the length of tool holder 14, the front end of which formed as a mating bore 28 for receiving and central pin or plug 18. The tool head 10 has an axial passage 26. In a coupling position an annular end face 30 of the tool holder 14 contacts the annular surface 20 of the tool head 10.

The annular recess 32 opening into the bore 28, is provided near the front end of the tool holder 14. The tension ring 16 is inserted into the recess 32 to be displaceable in radial direction but held non-displaceably in axial direction. Ring 16 has an annular clamping surface 34 associated to the rearward side surface and an annular supporting surface 36 which is formed by the front side surface of the ring 16. The clamping surface 34 is inwardly offset with respect to the supporting surface 36.

The pin 18 of the tool head 10 is provided with a peripheral groove 38 substantially axially aligned with recess 16. An annular shoulder 40 extends from the bottom of groove 38 to the outer circumference of pin 18.

The ring 16 consists of spring steel and in its non-deformed uncoupling position substantially fills the recess 32 and at most only with a small amount projects into the interior of bore 28.

According to FIG. 4 both ends of ring 16 have openings 42, 44. A screw 46 is screwed into the tool holder 14 and projects into opening 42 to hold this ring end in position. A slide 48 is coupled in the same way with the opening 44 of the other ring end. Slide 48 has an internal thread into which a screw 50 is threaded, which can be actuated from outside of the tool holder, to draw the slide 48 to the left in FIG. 4, whereby the peripheral distance between the ring ends is reduced by an amount of 6 millimeters. Thereby the diameter of ring 16 is reduced by 2 millimeters. During this diameter reduction the clamping surface 34 of ring 16 contacts the annular shoulder 40 of pin 18 and because this shoulder according to FIG. 2 is of conical form the radial movement of ring 16 is converted into an axial displacement of pin 18 in relation to the tool holder 14. Only a small axial displacement of for example ⅛ millimeter is sufficient to firmly clamp the annular surfaces 20, 30 of the tool portions 10,14 against each other.

If the annular shoulder 40 would be designed to form a convex line—as seen in a longitudinal section—instead of a straight line as shown in FIG. 2, the conversion ratio of the axial connecting force in relation to the radial actuating force of the ring would become progressive.

Figure 7:
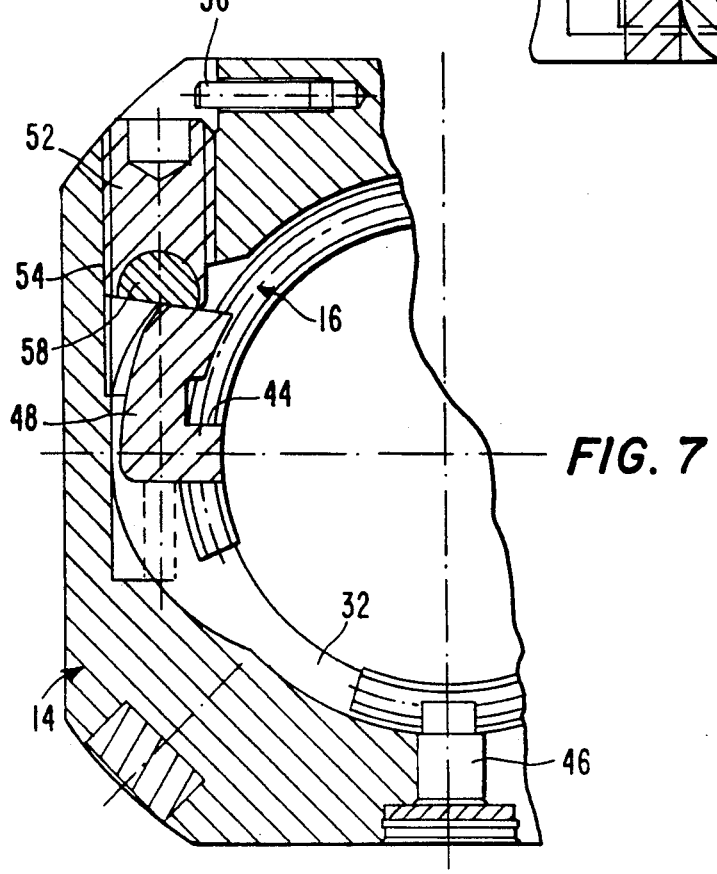
FIG. 7 is a cross-section of a third embodiment of the actuating device.

According to FIG. 3 the side surfaces of the recess 32 are inclined in rearward direction, as seen in longitudinal section, that means both side surfaces are conically shaped. At least the supporting surface 36 of ring 16 has a correspondingly shaped conical form. Therefore, any radial movement of ring 16 results in an axial displacement thereof. The annular shoulder 40 in this embodiment lies in a radial plane and the same is true with respect to the clamping surface 34. The embodiment of FIG. 7 differs from that of FIG. 4 mainly in that a screw 52 is provided which—while acting substantially tangentially on ring 16 as does screw 50 in FIG. 4—screw 52 is threaded in an internal thread 54 of the tool holder 14 and by means of a ball portion 58 presses against the slider 48, to reduce the diameter of ring 16. A securing bolt 56 holds screw 52 in its coupling position.

Figure 6:
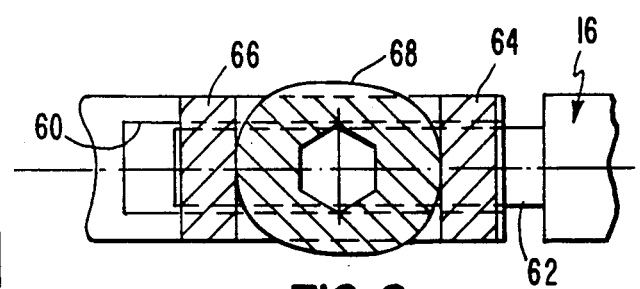
FIG. 6 is a longitudinal section taken along line 6—6 of FIG. 5.

In FIG. 5 and 6 another actuating device is shown, which differs mainly from that described above in that the interspace between the ends of ring 16 must be increased to reduce the diameter thereof and in that both ends of ring 16 are simultaneously displaced. One end of the ring 16 has a longitudinally extending central slot 60 into which engages a tongue 62 of the other ring end. Both ends of ring 16 thereby overlap in peripheral direction. One abutment 64 is welded on the bifurcated one ring end and another abutment 66 is welded on the tongue end of the other ring end. An eccentric plate 68 is mounted for rotation in the tool holder 14 between both abutments 64, 66. Through a hole of the tool holder a key 70 can be coupled with the eccentric plate 68 to rotate same in order to press both abutments away from one another. A rotation about 90 degrees will be sufficient to bring ring 16 in its coupling position.

While the drawings show a tool head comprising a fitting pin and a tool holder provided with a mating bore comprising the recess and the tension ring inserted therein, the arrangement can be reversed to provide the pin on the tool holder and the mating bore with tension ring in the tool head.

I claim:

1. A device in combination with, and for connecting a first tool portion having a central plug to a second tool portion having a mating bore adapted to receive the central plug of the first tool portion, the mating bore having an annular groove therein, the device comprising:

an open-ended spring clamping ring radially displaceably received in the annular groove provided in the mating bore, the groove having opposite annular side surfaces, and the clamping ring having an annular supporting surface, at least one of the annular side surfaces being conical, the clamping ring having its supporting surface engaged with said conical side surface of the groove, the plug having an annular shoulder, the clamping ring having a clamping surface engaged with the supporting surface of the plug, actuating means provided in the second tool portion and engaging at least one end of the clamping ring to adjust a circumferential interspace between open ends of the clamping ring, the actuating means having a first position in which the clamping ring is to a great extent received in the groove and upon actuating of the actuating means the clamping ring with its supporting surface supported by said conical side surface of the groove being moved radially inward and at the same time in an axial direction to bring the clamping surface of the clamping ring into contact with the annular shoulder of the plug, and the actuating means having a second position in which the clamping surface of the clamping ring is pressed axially against the annular shoulder of the plug to draw both tool portions tightly together.

2. A device as claimed in claim 1, wherein the annular groove has a pair of opposite conical side surfaces with a constant axial interspace therebetween the plug being inserted into the mating bore in an insertion direction and the conical side surfaces being inclined into the bore and in the insertion direction.

3. A device as claimed in claim 1, wherein the supporting surface of the clamping ring is conically shaped and is complementary to the conical side surface of the groove.

4. A device as claimed in claim 1, wherein the second tool portion has a chamber, and at least one end of the clamping ring is provided with an opening, a separate abutment element positively engages into the opening and mounted for peripheral movement in the chamber of the second tool portion, the chamber opening into the groove.

5. A device as claimed in claim 1, wherein the actuating means comprises a screw bolt positioned in a hole extending in a radial plane intersecting said clamping ring and substantially in a tangential direction to the clamping ring, the screw bolt being in threaded engagement with an internal thread of the hole.

6. A device as claimed in claim 1, wherein the actuating means comprises a screw bolt arranged in a hole extending in a radial plane intersecting said clamping ring and substantially in a tangential direction thereto, the screw bolt being in threaded engagement with an internal thread of an abutment at one end of the clamping ring.

7. A device according to claim 1, wherein the clamping ring extends around by more than 360° and has overlapping ends and wherein the actuating means comprises a pusher enlarging the interspace between the ends of the clamping ring when the diameter of the clamping ring is reduced to achieve a connection together of the tool portions.

8. A device as claimed in claim 7, wherein the actuating means comprises an eccentric plate mounted for rotation in the second tool portion, a plane of rotation of the eccentric plate being substantially tangential with respect to the clamping ring.

9. A device as claimed in claim 1, wherein the actuating means engages a pair of abutments each one provided at one end of the clamping ring.

* * * * *